J. T. THOMPSON.
MEANS FOR LUBRICATING AMMUNITION.
APPLICATION FILED OCT. 16, 1917.
1,305,027.
Patented May 27, 1919.
6 SHEETS—SHEET 1.
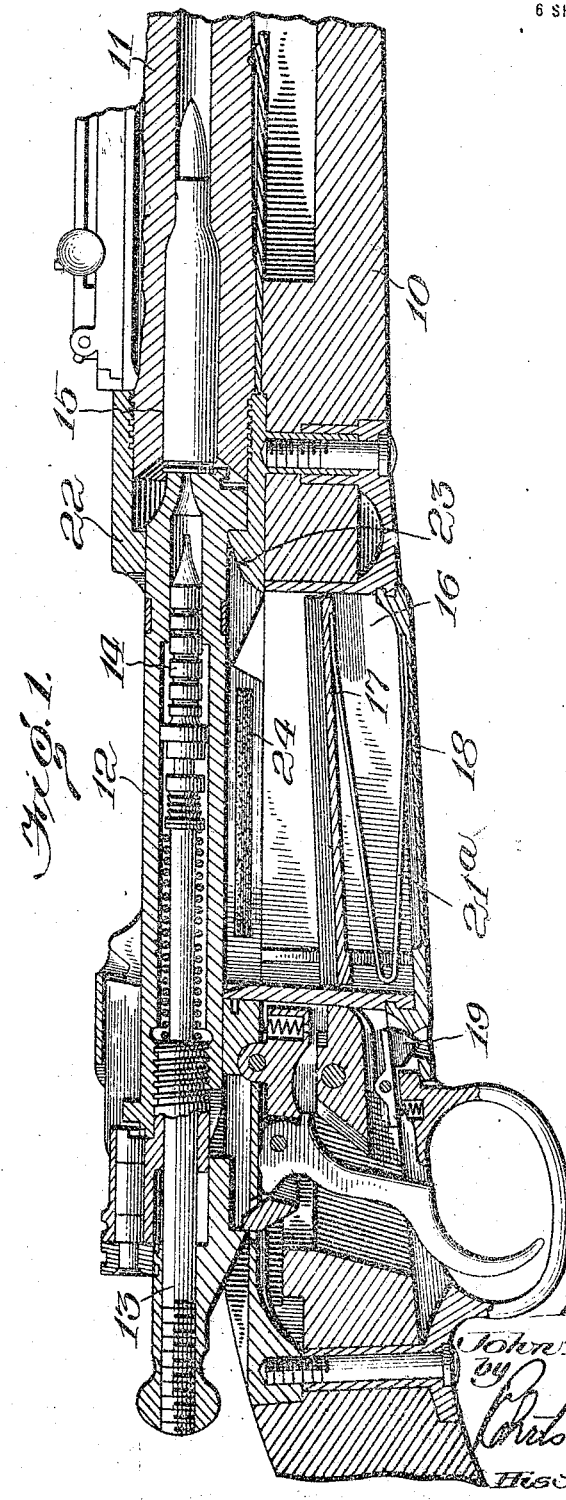

J. T. THOMPSON.
MEANS FOR LUBRICATING AMMUNITION.
APPLICATION FILED OCT. 16, 1917.
1,305,027.
Patented May 27, 1919.
6 SHEETS—SHEET 2.
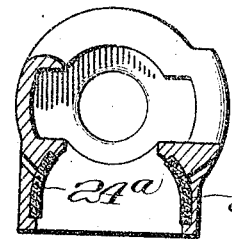
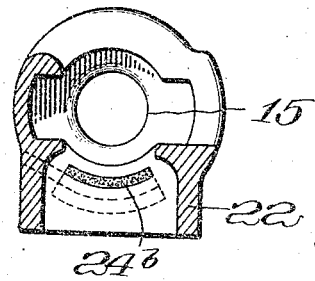
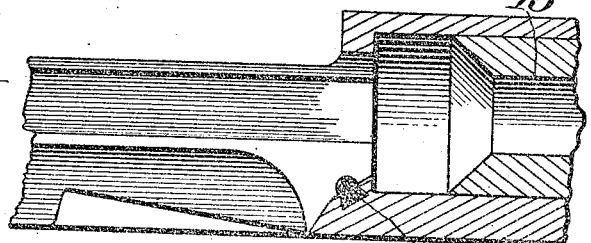
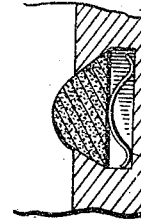
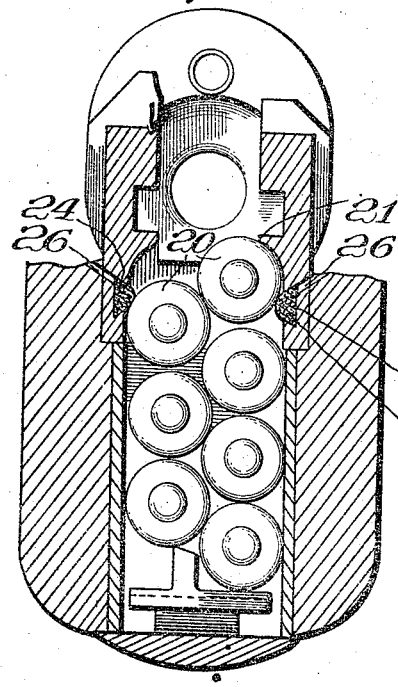
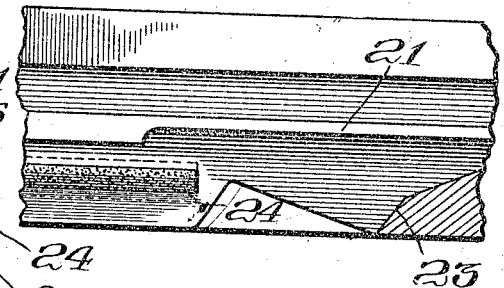
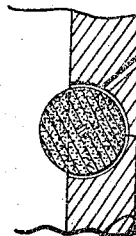
Inventor:
John T. Thompson,
by Roberts, Roberts & Cushman
His Attorneys J. T. THOMPSON.
MEANS FOR LUBRICATING AMMUNITION.
APPLICATION FILED OCT. 16, 1917.
1,305,027.
Patented May 27, 1919.
6 SHEETS—SHEET 3.
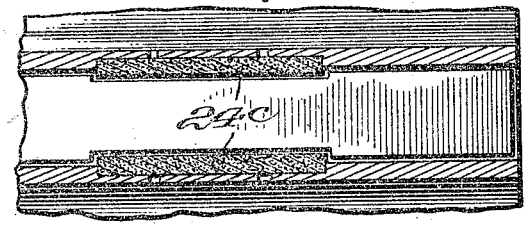
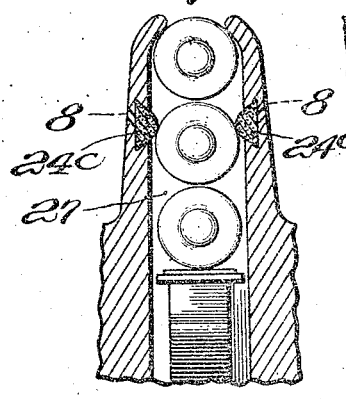
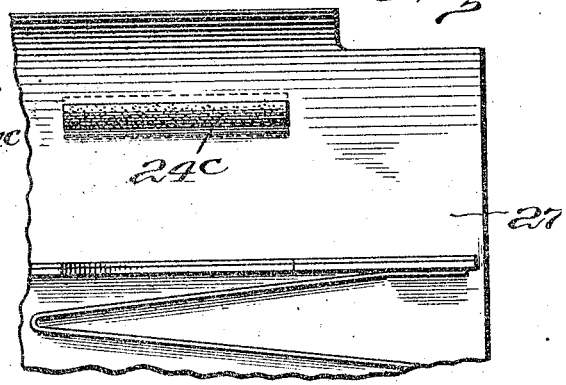
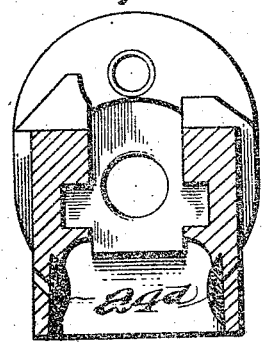
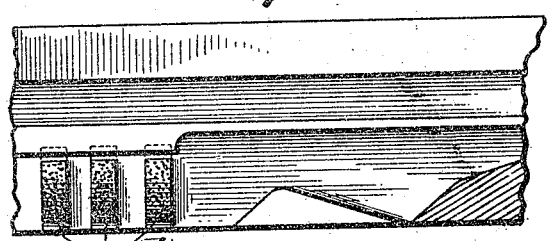
Inventor:
John T. Thompson,
by Rohrs, Rohrs & Cushman
His Attorneys.

J. T. THOMPSON.
MEANS FOR LUBRICATING AMMUNITION.
APPLICATION FILED OCT. 16, 1917.
1,305,027.
Patented May 27, 1919.
6 SHEETS—SHEET 4.
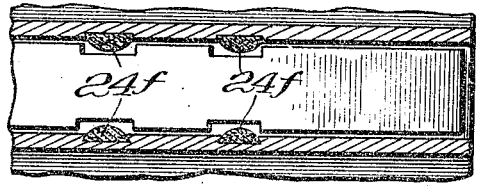
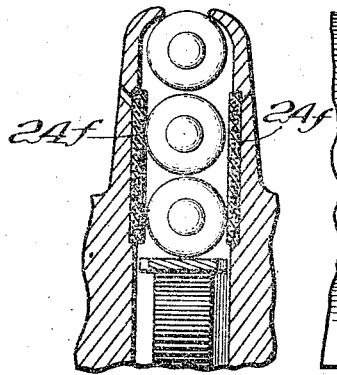
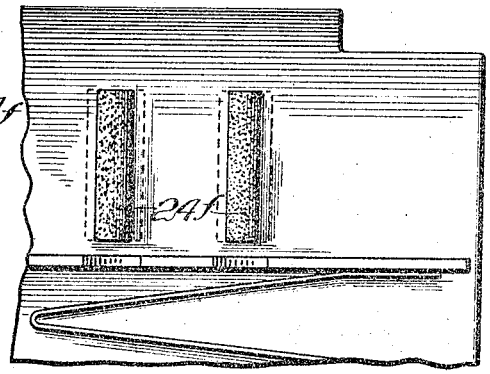
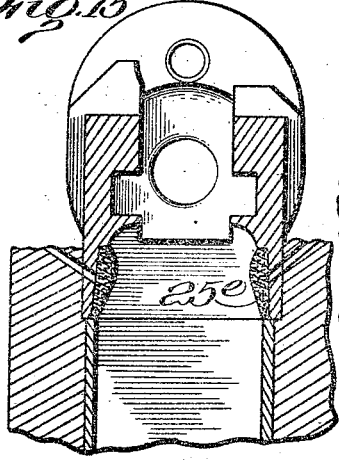
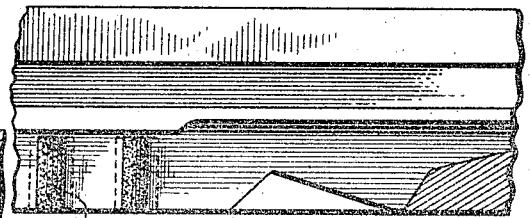
Inventor:
John T. Thompson,
by Rohrts Rohrts & Cushman
His Attorneys.

J. T. THOMPSON.
MEANS FOR LUBRICATING AMMUNITION.
APPLICATION FILED OCT. 16, 1917.
1,305,027.
Patented May 27, 1919.
6 SHEETS—SHEET 5.
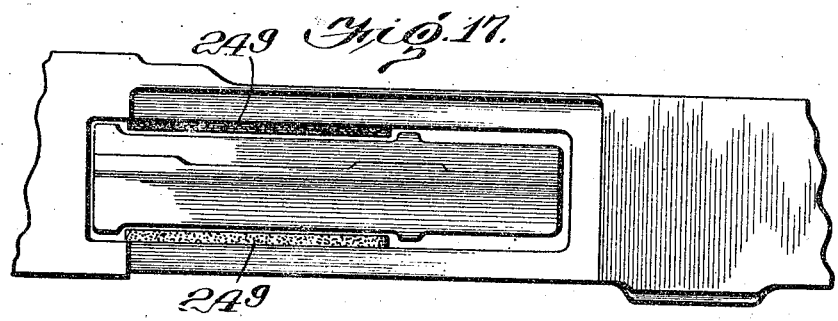
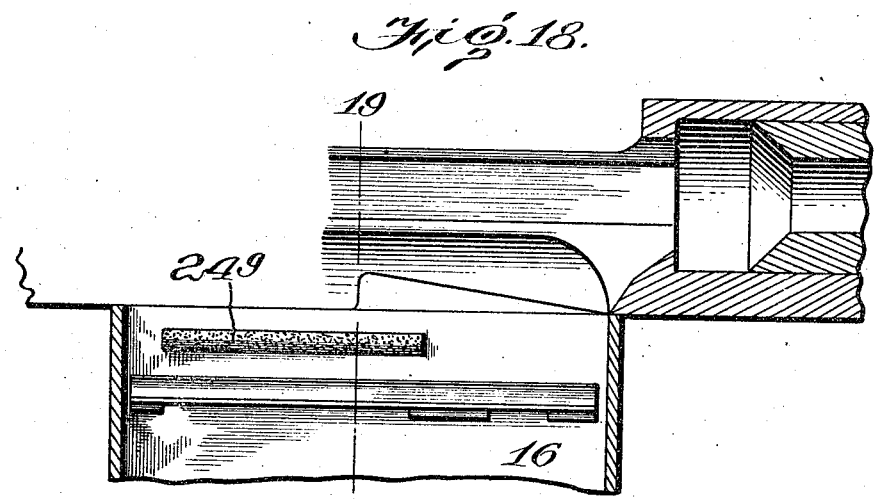
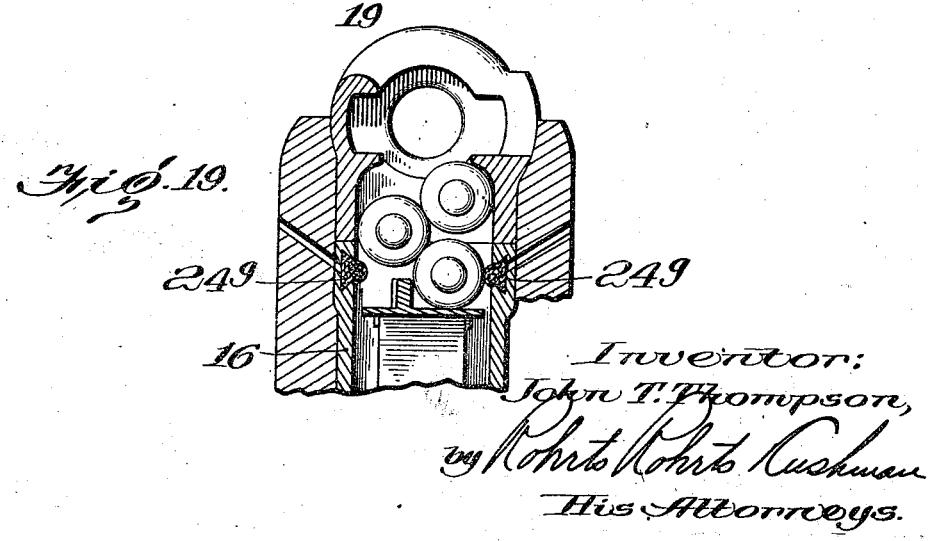
Inventor:
John T. Thompson,
by Roberts Roberts Cushman
His Attorneys.

J. T. THOMPSON.
MEANS FOR LUBRICATING AMMUNITION.
APPLICATION FILED OCT. 16, 1917.
1,305,027.
Patented May 27, 1919.
6 SHEETS—SHEET 6.
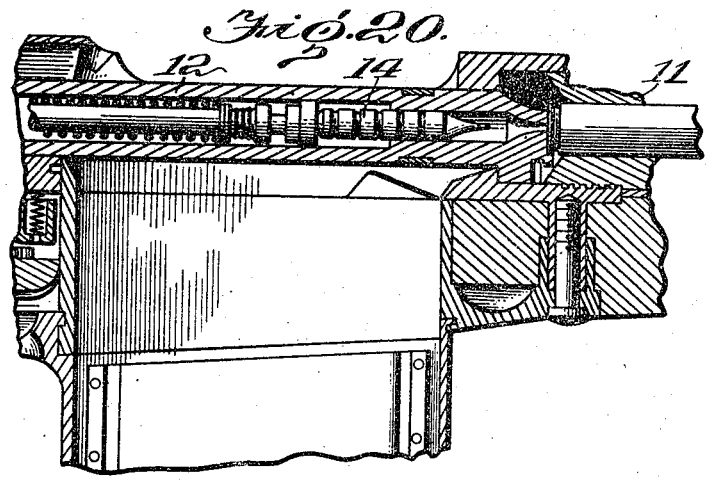
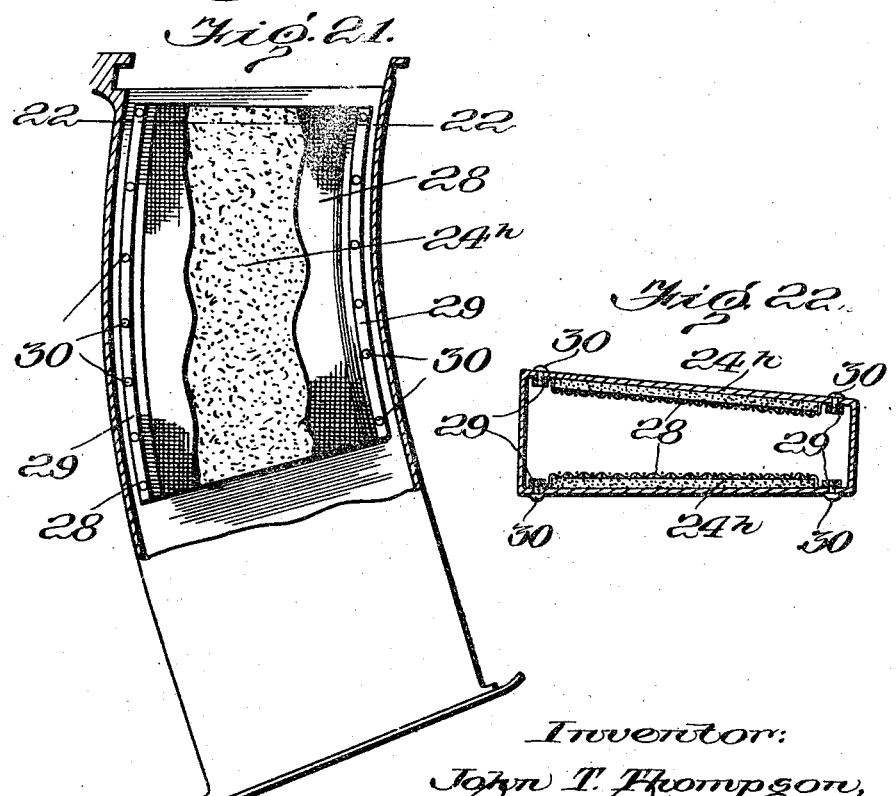
Inventor:
John T. Thompson,
by Roberts, Roberts & Cushman
His Attorneys.

UNITED STATES PATENT OFFICE.

JOHN T. THOMPSON, OF NEWPORT, KENTUCKY.

MEANS FOR LUBRICATING AMMUNITION.

1,305,027. Specification of Letters Patent. Patented May 27, 1919.

Original application filed June 16, 1917, Serial No. 175,152. Divided and this application filed October 16, 1917. Serial No. 196,882.

*To all whom it may concern:*

Be it known that I, JOHN T. THOMPSON, a citizen of the United States of America, and resident of Newport, in the county of Campbell and State of Kentucky, have invented new and useful Improvements in Means for Lubricating Ammunition, of which the following is a specification.

The present invention relates to ordnance, this application being a division of my former application Sr. No. 175,152, filed June 16, 1917. More particularly the invention relates to means for effecting lubrication between the contacting surfaces of the case of a cartridge, shell, or other type of fixed ammunition, and the chamber of the gun or firearm containing the ammunition, preferably by lubricating the case of a cartridge, shell or other type of fixed ammunition before it is seated in the chamber.

The object of the present invention is to provide means for obtaining proper lubrication between the contacting surfaces of the ammunition case and the firing chamber of the gun or firearm, so as to reduce and make more uniform and constant the frictional resistance between the contacting surfaces, and thus facilitate the extraction of the ammunition case from the chamber and improve the operation of the firing device.

More particularly it is the object of my invention to provide a gun or firearm, or the mechanism for automatically feeding the ammunition thereto, during operation of the gun or firearm, with lubricating means so disposed with respect to the firing chamber as to effect proper lubrication of the contacting surfaces between the ammunition case and the firing chamber. In the preferred forms shown and described in the present illustrated disclosure of my invention, the lubricant is applied to the ammunition while the latter is passing into the magazine or from the magazine to the firing chamber or both; but, of course, the desired lubrication may be secured in various other ways, it being only essential that the ammunition be lubricated by means associated with the gun, or firearm, or the means for feeding the ammunition to the firing chamber, or that lubrication be effected during or after its introduction to the gun mechanism.

In the drawings herewith, and in the description accompanying those drawings, the invention is shown as applied to a magazine rifle of any ordinary or desired construction; the ammunition is shown as a cartridge made up of a charged metallic case or shell with a bullet mounted therein in the usual manner, and the lubricating means is shown as comprising a pad or a series of pads to which the lubricant has been applied, and against which the ammunition is brought into contact while the latter is passing into the magazine or from the magazine to the firing chamber, or both, but it is to be understood that this illustration and description is merely one adaptation of the invention and is in no way restrictive of the invention.

In the drawings:

Figure 1 is a longitudinal sectional view through so much of a magazine rifle as is necessary to show the application of one embodiment of my invention thereto, in this embodiment the lubricating pads being disposed within and extending longitudinally of the magazine opening of the receiver.

Fig. 2 is a vertical sectional view taken transversely through the receiver and magazine of a gun structure similar to that shown in Fig. 1.

Fig. 3 is an enlarged detail view taken on a longitudinal line through the magazine opening of the gun shown in Fig. 2.

Fig. 4 is a sectional view taken transversely through the receiver of the gun shown in Fig. 1 and shows a slightly different arrangement of lubricating pads.

Fig. 5 is a view similar to Fig. 4 but the lubricating pad is disclosed as located upon the inclined surface up which the cartridge rides when forced into the firing chamber.

Fig. 6 is a longitudinal view taken centrally through Fig. 5.

Fig. 7 is a transverse vertical sectional view through the magazine portion of another type of gun, and shows another embodiment of my invention.

Fig. 8 is a sectional view taken on line 8—8 Fig. 7.

Fig. 9 is a vertical longitudinal view through the structure shown in Fig. 7.

Figs. 10 and 11 are similar to Figs. 2 and 3 but show a slightly different arrangement of pads.

Figs. 12, 13 and 14 are similar to Figs. 7, 8 and 9 respectively, but show another embodiment of my invention.

Figs. 15 and 16 are similar to Figs. 10 and 11 but show a slightly different manner of mounting the pads within the magazine opening.

Fig. 17 is a top plan view of that portion of a rifle in which the magazine opening or well is located, and the lubricating pads are shown as located within the magazine.

Fig. 18 is a vertical longitudinal section through Fig. 17.

Fig. 19 is a vertical transverse section taken on the line 19—19, Fig. 18.

Fig. 20 is a vertical longitudinal sectional view through the magazine section of the rifle shown in Fig. 1, and to which an extension magazine is secured, the extension magazine having a lubricating pad against which the cartridges are adapted to engage.

Fig. 21 is a side elevational view of the extension magazine parts of the magazine being broken away to more clearly illustrate the lubricating pad.

Fig. 22 is a transverse section taken on the line 22—22 of Fig. 21.

Figs. 23, 24 and 25 are enlarged fragmentary sectional views through portions of the wall of the magazine opening of the receiver and are illustrative of the various changes in details of which my invention is susceptible.

Referring to the drawings, and more particularly to Fig. 1, wherein is disclosed so much of a regulation rifle now used in the United States Army as is necessary to illustrate the application of my invention thereto, 10 designates the stock, 11 the barrel, 12 the breech bolt, 13 the firing pin rod, 14 the striker, 15 the firing chamber of the barrel, and 16 the magazine. Located within the magazine is a follower 17, and the magazine is closed by a floor plate 18, locked in position by a floor plate catch 19. The follower plate is normally urged upwardly so as to retain the uppermost cartridge 20 against the overhanging ledge 21, (Fig. 2) by means of a magazine spring 21ª. Between the magazine and the barrel is a receiver 22 having a slanting or inclined feeding surface 23, which directs the cartridges, during the feeding of the same from the magazine to the firing chamber, into the firing chamber. It is not deemed necessary to describe each of the parts illustrated, for the construction of these parts and the operation of the gun or rifle will be readily understood by those familiar with this art. It is understood, of course, that during the operation of the gun and upon extraction of the empty ammunition case, the bolt 12 is withdrawn from the magazine opening and the follower urges the uppermost shell upwardly against one of the overhanging ledges 21. Upon the forward movement of the bolt, its forward end will engage the uppermost edge of the cartridge and force the same forwardly, and the cartridge will ride up the inclined feeding surface 23 into the firing chamber.

In the embodiments of my invention disclosed in Figs. 1 to 3, the lubricating means is shown as comprising pads 24 located in the magazine opening of the receiver 22 immediately above the upper edge of the magazine 16. These pads may be mounted in any suitable manner, but by way of illustration, they are disclosed as being located in grooves 25 extending longitudinally of the magazine opening of receiver 22, and these grooves have their opposite edges undercut so that the edges of the pads may engage in the undercut portions of the grooves, and be retained in position thereby.

The pads may be of any suitable material, and if desired, they may be constructed of any absorbent felt or fabric. For the purpose of introducing a lubricant to the pads I have disclosed oil holes 26 extending through the stock of the gun, and the metallic walls of the magazine opening, and, of course, one or more of these oil ducts may be employed for each pad.

It will be seen that during the operation of the gun and while the cartridge is being loaded into the magazine or is passing from the magazine to the firing chamber, the cartridges are successively brought into engagement with one of the pads 24 so that the cartridges are delivered to the firing chamber in a lubricated condition. The pads are located in the path of travel of the cartridges to the firing chamber, so that proper lubrication of each cartridge is insured. When employing a magazine the lubricating means should be so positioned that each of the cartridges is brought into operative relation to the lubricating means in transit to the firing chamber. The cartridges are fed into the magazine 16 through the magazine opening of the receiver 22, and while being so introduced they come into contact with the lubricating pads 24. I have found that it is not necessary to lubricate the entire circumferential external surface of the cartridges or ammunition, and that it is only necessary to apply the lubricant to the cartridge along one or more lines of its periphery. The amount of lubricant necessary between the external surface of the ammunition and the internal surface of the firing chamber to insure a smooth operation of the gun, is comparatively small, the amount depending, of course, upon the type of gun used.

In Fig. 4, the pads 24ª are also located in the internal walls of the magazine opening of the receiver but in this embodiment, the pads extend over greater surfaces so that a greater amount of lubricant is applied to the cartridges as they pass from the magazine to the firing chamber.

In Figs. 5 and 6, instead of locating the pads adjacent the upper edge of the magazine 16, I have illustrated a pad 24ᵇ mounted upon the inclined surface 23 up which the cartridges ride when being fed into the firing chamber 15. It will be seen that as the cartridges ride up the inclined surface, they will wipe against the pad so as to take up a proper amount of lubricant.

In Figs. 7, 8 and 9, I have shown my invention applied to a different type of magazine, the cartridges being arranged in a single column instead of staggered as in Fig. 2, the arrangement being employed in the Ross rifle. The magazine is designated by the numeral 27 and adjacent the upper edge of this magazine are located pads 24ᶜ, these pads being similar in structure, and being mounted in a manner like those shown in Figs. 1 to 3.

Figs. 10 and 11 are similar to Figs. 2 and 3 but in this embodiment, instead of locating continuous pads longitudinally in the walls of the magazine opening, I have illustrated a series of small spaced apart pads 24ᵈ. The grooves in which the pads 24ᵈ are mounted, are undercut at their upper edges for the reception of the upper ends of the pads. It is, of course, obvious that any number of pads 24ᵈ may be employed along each side of the magazine opening, and that their manner of attachment may be varied as desired. For instance, the grooves in which the pads are located may have their vertical edges undercut as designated by the numeral 25ᵉ, in Figs. 15 and 16.

In the embodiment shown in Figs. 12, 13 and 14 I have shown the pads 24ᶠ as being disposed vertically of the magazine chamber of a single column feed magazine. As the cartridges are moved upwardly, they will engage against the pads 24ᶠ so as to receive the lubricant, as shown in Fig. 12.

In Figs. 17, 18 and 19 the same structure of gun is illustrated as that shown in Figs. 5 and 6. The pads 24ᵍ instead of being mounted within the magazine opening of the receiver as shown in Figs. 2 and 3, are located within and adjacent the upper edge of the magazine 16 and extend longitudinally thereof.

Referring now to the embodiment shown in Figs. 20, 21 and 22, wherein I have illustrated an extension magazine secured to the regulation rifle of the United States Army, the magazine is disclosed as having, on its opposite walls, lubricating pads 24ʰ, and in this particular illustrative disclosure, these pads cover about one-half of the opposite walls of the extension magazine. It is, of course, obvious, however, that the pads may cover the entire surface of the walls of the magazine, or they may be limited in width and be located adjacent the upper edge of the magazine, it being only essential that the pads are so located that the cartridges stored in the magazine may be properly lubricated while passing to the firing chamber. If desired the pads may be covered with a wire netting 28, secured in place by metallic strips 29 and screws 30, the latter being passed through suitable openings in the magazine walls and being threaded into openings in the strips 29.

It is, of course, obvious that while I have shown in some of the preceding embodiments, the lubricating means as comprising pads of felt mounted within grooves, I do not wish to restrict myself to this particular type of lubricating means. The pads may be of any suitable construction and may be attached in any suitable manner. If desired, the pads may be resiliently urged outwardly of the grooves, by means of a spring 31 as shown in Fig. 23, or a pliant or soft rubber pad 32 as shown in Fig. 25. Instead of a stationary pad, a rotating brush or roller may be employed, and as illustrating one of the innumerable modifications of which my invention is susceptible, I have shown in Fig. 24 the lubricating means as comprising a roller 33. The magazines herein referred to may be either fixedly or detachably mounted on the gun.

It will be noted that in each of the embodiments of my invention hereinbefore described the cartridges or ammunition are lubricated after or during their introduction to the gun mechanism, or both. During the movement of the cartridges into, or from, the magazine to the firing chamber, the cartridges engage against the lubricating means which are placed in their path so that the cartridges are suitably lubricated, and proper lubrication between the external surface of each cartridge and the chamber is insured. However, the particular means and the manner for lubricating the cartridges are shown by way of illustration only; and it is understood that proper lubrication of the cartridges during or after their introduction to the gun mechanism, or the means for feeding the cartridges thereto, may be effected in any suitable manner.

I claim:

1. A gun comprising a magazine, a firing chamber, means for feeding ammunition from the magazine to the firing chamber, and means disposed at least partially within the magazine for lubricating the ammunition.

2. A gun comprising a magazine, a firing chamber, means for feeding ammunition from the magazine to the firing chamber, and means mounted in the magazine for applying lubrication to the ammunition before it enters the firing chamber.

3. A gun comprising a magazine, a firing chamber, means for feeding ammunition from the magazine to the firing chamber, and means disposed at least partially within the magazine in the path of travel of the ammunition to the firing chamber for lubricating the ammunition.

4. A gun comprising a magazine, a firing chamber, means for feeding ammunition from the magazine to the firing chamber, and means disposed at least partially within the magazine for lubricating ammunition singly while in transit to the firing chamber.

5. A gun comprising a magazine, a firing chamber, means for feeding ammunition from the magazine to the firing chamber, and means disposed at least partially in the magazine for automatically lubricating ammunition while in transit to the firing chamber.

6. A gun comprising a magazine, a firing chamber, and a lubricant-carrying body disposed at least in part in the magazine so as to contact with the ammunition.

7. A gun comprising a magazine, a firing chamber, and a lubricant-carrying body disposed at least in part in the magazine in the path of ammunition in transit to the firing chamber.

8. A gun comprising a magazine, a firing chamber, and a lubricant-absorbent body disposed at least in part in the magazine so as to contact with the ammunition.

9. A gun comprising a magazine, a firing chamber, a lubricant-carrying body disposed at least in part in the magazine so as to contact with the ammunition, and means for supplying lubricant to said body.

10. A gun comprising a magazine, a firing chamber, and a lubricant-carrying body disposed at least in part in the magazine in the path of ammunition in transit to the firing chamber, the gun having ducts for supplying oil to the body.

11. A gun comprising a firing chamber, means for feeding ammunition to the firing chamber, and one or more elongate lubricant-carrying bodies disposed in, and longitudinally of, the path of travel of the ammunition to the firing chamber for lubricating the ammunition in transit.

12. A gun comprising a magazine, a firing chamber, means for feeding ammunition from the magazine to the firing chamber, and one or more elongate lubricant-carrying bodies disposed at least in part in the magazine longitudinally of the path of travel of the ammunition for lubricating the ammunition.

13. A gun comprising a firing chamber, means for lubricating the ammunition before it is seated in the firing chamber, and a reticulate covering for at least a portion of the lubricating means.

14. A gun comprising a firing chamber, means for feeding ammunition to the firing chamber, a lubricant-carrying body disposed along the path of travel of ammunition in transit to the firing chamber, and a reticulate covering over at least a portion of the lubricant-carrying-body, whereby lubricant is supplied through the reticulate covering to the ammunition in transit.

15. A gun comprising a firing chamber, means for feeding ammunition to the firing chamber, a lubricant-carrying body disposed along the path of travel of ammunition in transit to the firing chamber, and a reticulate covering of hard material over at least a portion of the lubricant-carrying body, whereby lubricant is supplied through the reticulate covering to the ammunition in transit.

16. A gun comprising a firing chamber, means for feeding ammunition to the firing chamber, a lubricant-carrying body disposed along the path of travel of ammunition in transit to the firing chamber, and a reticulate metallic covering over at least a portion of the lubricant-carrying body, whereby lubricant is supplied through the reticulate covering to the ammunition in transit.

17. A gun comprising a magazine, a firing chamber, means for feeding ammunition from the magazine to the firing chamber, a lubricant-carrying body disposed at least in part in the magazine, and a reticulate covering over the said body.

Signed by me at Washington, D. C., this tenth day of October, 1917.

JOHN T. THOMPSON.